United States Patent
Lounder et al.

(10) Patent No.: US 10,085,384 B2
(45) Date of Patent: Oct. 2, 2018

(54) STRAP SEALING ASSEMBLY FOR AGRICULTURAL IMPLEMENT

(71) Applicant: CNH Industrial America LLC, New Holland, PA (US)

(72) Inventors: Joshua L. Lounder, Honeybrook, PA (US); Dominick B. Rizzon, Leola, PA (US); Shaun A. O'Donnell, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 855 days.

(21) Appl. No.: 14/674,996

(22) Filed: Mar. 31, 2015

(65) Prior Publication Data

US 2015/0272010 A1    Oct. 1, 2015

Related U.S. Application Data

(60) Provisional application No. 61/972,770, filed on Mar. 31, 2014.

(51) Int. Cl.
| | |
|---|---|
| *A01F 15/14* | (2006.01) |
| *B65B 13/32* | (2006.01) |
| *A01F 15/04* | (2006.01) |
| *B65B 27/12* | (2006.01) |

(52) U.S. Cl.
CPC .............. *A01F 15/14* (2013.01); *A01F 15/04* (2013.01); *B65B 13/32* (2013.01); *B65B 27/12* (2013.01)

(58) Field of Classification Search
CPC ........ A01F 15/04; A01F 15/042; A01F 15/14; A01F 15/146; A01F 15/145; B65B 13/04; B65B 13/20; B65B 13/28; B65B 13/30; B65B 13/32; B65B 27/12
USPC ....................... 100/29, 31, 33 R, 33 PB, 179
See application file for complete search history.

(56) References Cited

U.S. PATENT DOCUMENTS

| | | | |
|---|---|---|---|
| 4,206,698 A | 6/1980 | Nicholson | |
| 4,378,262 A | 3/1983 | Annis, Jr. | |
| 4,459,904 A | 7/1984 | Probst et al. | |
| 4,466,345 A | 8/1984 | Kaldenbach | |
| 4,729,301 A * | 3/1988 | Smith ................... B30B 9/3007 | |
| | | | 100/215 |
| 4,989,397 A | 2/1991 | Tomac et al. | |

(Continued)

FOREIGN PATENT DOCUMENTS

| | | |
|---|---|---|
| DE | 10131165 A1 | 2/2003 |
| EP | 0904685 A2 | 12/2002 |

(Continued)

*Primary Examiner* — Jimmy T Nguyen
(74) *Attorney, Agent, or Firm* — Patrick M. Sheldrake (57) ABSTRACT

An agricultural baler includes a baling chamber configured to receive a compressible material and a track positioned about at least a portion of the baling chamber. The track is configured to receive a strap and to guide the strap around the portion of the baling chamber. The agricultural baler also includes a sealing assembly positioned adjacent to a first side of the baling chamber and configured to receive the strap and to seal the strap into a loop around the compressible material to form a strapped bale. The sealing assembly is configured to move relative to the baling chamber as the sealing assembly seals the strap into the loop around the compressible material as the compressible material moves toward an outlet at a second end of the baling chamber.

15 Claims, 7 Drawing Sheets

(56) References Cited

U.S. PATENT DOCUMENTS

| | | | |
|---|---|---|---|
| 5,078,057 A | 1/1992 | Pearson | |
| 5,704,283 A | 1/1998 | Wiedel | |
| 6,487,833 B1 | 12/2002 | Jaenson et al. | |
| 6,536,336 B1 | 3/2003 | Jaenson et al. | |
| 6,971,307 B2 | 12/2005 | Daniel et al. | |
| 7,412,815 B2 | 8/2008 | Schmetzer | |
| 7,526,995 B2 * | 5/2009 | Actis | A01D 59/00 100/2 |

FOREIGN PATENT DOCUMENTS

| | | | |
|---|---|---|---|
| FR | 2735947 A1 | 1/1997 |
| GB | 1085829 A | 10/1967 |
| WO | 9313988 A1 | 7/1993 |

* cited by examiner

STRAP SEALING ASSEMBLY FOR AGRICULTURAL IMPLEMENT

CROSS REFERENCE TO RELATED APPLICATIONS

This application claims the benefit of and priority to U.S. Provisional Application No. 61/972,770, filed Mar. 31, 2014, entitled STRAP SEALING ASSEMBLY FOR AGRICULTURAL IMPLEMENT, which is hereby incorporated by reference in its entirety.

BACKGROUND OF THE INVENTION

The present invention relates generally to the field of packaging compressible materials, and more particularly, to systems for strapping bales of crop materials.

Generally, rectangular or square balers are utilized to compress certain materials into rectangular bales to facilitate storage and handling of the material. Usually, the material is compressed within a baling chamber until the material forms a bale of a desired size. Such balers typically include a mechanism for wrapping and knotting twine around the material to maintain the compressed shape of the bale. Unfortunately, twine may be difficult to remove from the bale during subsequent processing operations. In addition, the tensile strength of twine may be too low to effectively bind compressed materials in certain applications.

SUMMARY OF THE INVENTION

In one embodiment, an agricultural baler includes a baling chamber configured to receive a compressible material and a track positioned about at least a portion of the baling chamber. The track is configured to receive a strap and to guide the strap around the portion of the baling chamber. The agricultural baler also includes a sealing assembly positioned adjacent to a first side of the baling chamber and configured to receive the strap and to seal the strap into a loop around the compressible material to form a strapped bale. The sealing assembly is configured to move relative to the baling chamber as the sealing assembly seals the strap into the loop around the compressible material as the compressible material moves toward an outlet at a second end of the baling chamber.

In one embodiment, an agricultural baler includes a baling chamber configured to receive a compressible material. The agricultural baler also includes a sealing assembly having sealing device and a sealing frame. The sealing device is configured to seal a strap into a loop around the compressible material. The sealing frame is coupled to the sealing device and includes a slide mechanism configured to enable the sealing assembly to move relative to the baling chamber as the sealing device seals the strap into the loop around the compressible material as the compressible material moves toward an outlet at a second end of the baling chamber.

In one embodiment, a method for baling an agricultural crop material includes feeding an end of a strap into a track extending around at least a portion of a baling chamber while a sealing assembly is in a first position. The method also includes moving the sealing assembly from the first position to a second position after the end of the strap is fed into the track. The method further includes transferring the end of the strap into an opening of the sealing assembly while the sealing assembly is in the second position. The method also includes sealing the end of the strap to another portion of the strap with the sealing assembly as the sealing assembly moves from the second position toward the first position to form a strapped bale.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments described herein relate to systems for strapping a bale of material using a relatively high-strength strap. In particular, various components (e.g., a sealing assembly, tracks, and needles) are provided within a baler to efficiently surround the bale with the strap and to seal the strap securely around the bale. The described embodiments may provide certain advantages over traditional baling systems that use twine to contain bales. For example, the high strength and/or the large surface area of the strap may enable the strap to hold the bale in the desired size and density more efficiently than twine, thereby facilitating easy storage and handling of the bale. Additionally, unlike twine, the strap may be easily removed from the bale during subsequent processing operations. Furthermore, certain components described herein may enable efficient strapping of the bale, while substantially reducing or eliminating twisting of the strap as the strap is applied to and sealed around the bale.

Figure 1:
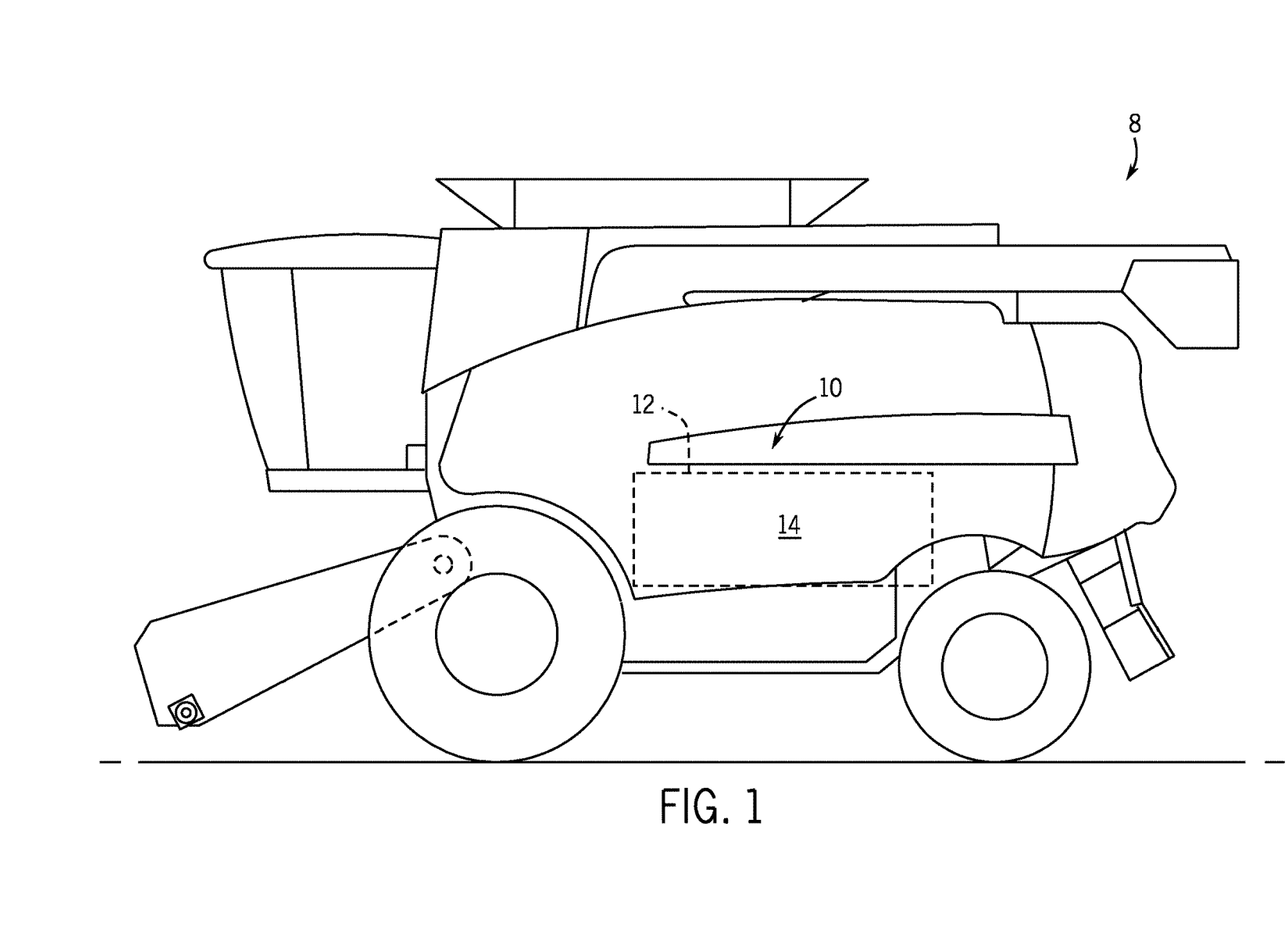
FIG. 1 is a side view of an embodiment of a self-contained vehicle including a baler.

Turning now to the drawings, FIG. 1 is a side view of a self-contained vehicle 8 having a baler 10. As illustrated, a frame 12 defines a baling chamber 14 that is supported and/or mounted within or on the self-contained vehicle 8. Material may flow into the baling chamber 14 via a conveyance system, where the material is baled in a manner described below. Thus, the baler 10 may be configured to collect and bale material as the self-contained vehicle 8 travels through the field.

Figure 2:
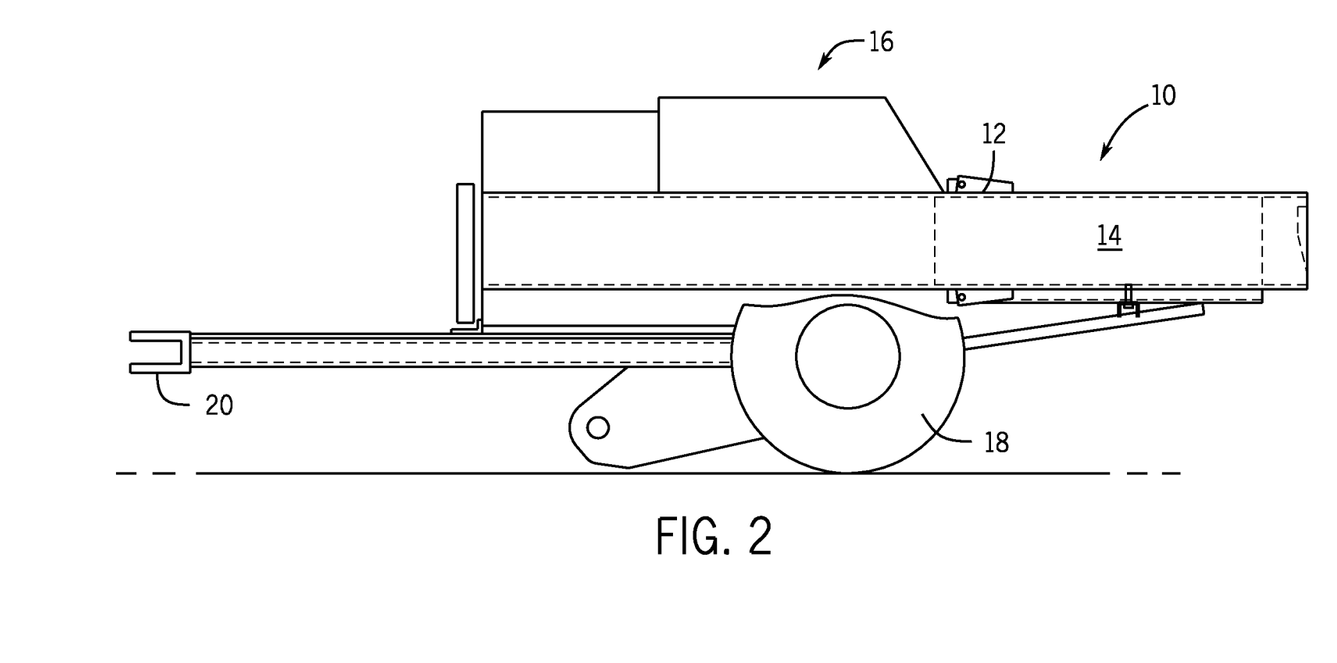
FIG. 2 is a side view of an embodiment of a towable implement having a baler, in which the towable implement is configured to be towed by a tow vehicle.

FIG. 2 is a side view of an embodiment of a towable implement 16 having the baler 10, in which the towable implement 16 is configured to be towed by a tow vehicle. As shown, the towable implement 16 includes the baler 10 having the baling chamber 14. The towable implement 16 may be ground-supported by wheels 18 and may be coupled to a tow vehicle (e.g., a harvester, a tractor, etc.) by a projection 20 that is configured to connect the towable implement 16 to the tow vehicle. Thus, the towable implement 16 may be pulled through a field. In such a configuration, the baler 10 collects and bales material as the towable implement 16 travels through the field behind the tow vehicle. It should be understood that the baler 10 disclosed herein may be incorporated in and/or utilized with any suitable implement or vehicle.

Figure 3:
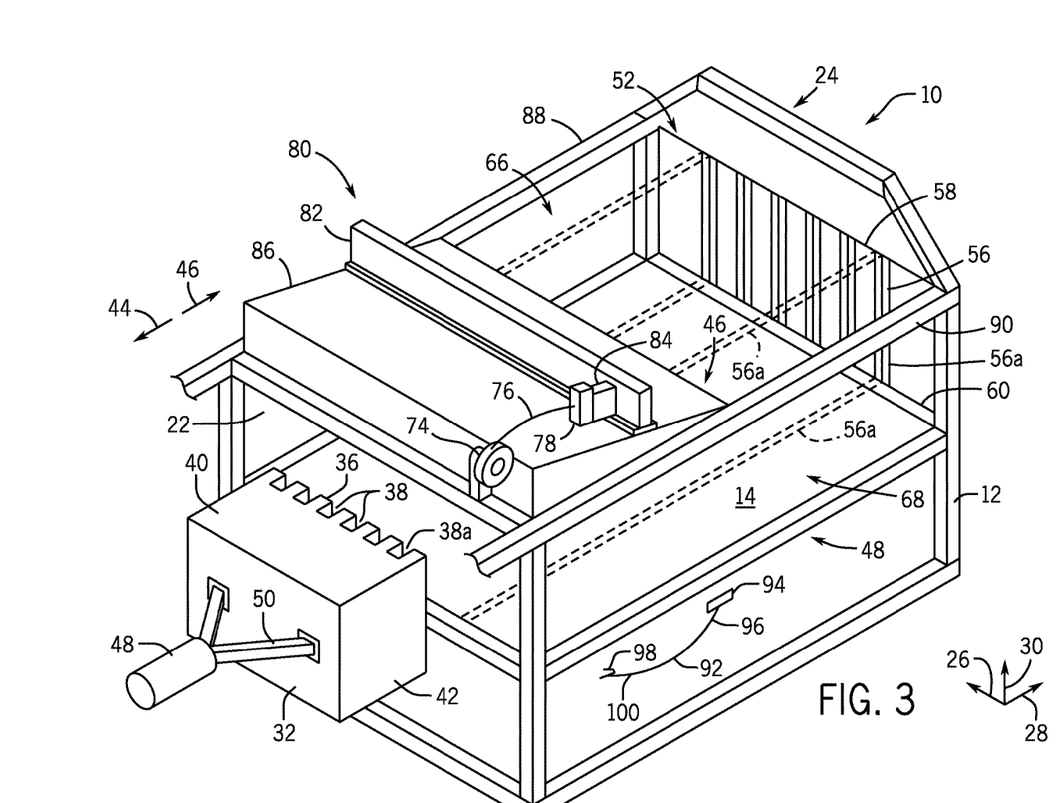
FIG. 3 is a perspective view of an embodiment of a portion of a baler configured to form and to strap rectangular bales of material.

FIG. 3 is a perspective view of an embodiment of a portion of the baler 10 configured to form and to strap rectangular bales of material (e.g., crop materials, such as hay, straw, grasses, silage, corn stalks, tobacco, cotton, biomass, etc.). In the illustrated embodiment, the baler 10 includes the frame 12 defining the baling chamber 14. The baling chamber 14 includes a first end 22 (e.g., forward end) and a second end 24 (e.g., rear end), which may generally relate to the direction of travel of the baler 10. For example, the baler 10 may be coupled to the tow vehicle and pulled through a field, collecting and baling the crop material as the baler 10 travels through the field. When connected to the tow vehicle, the forward end 22 is proximal to the vehicle, while the rear end 24 is distal from the tow vehicle. The baler 10 may also be included in a self-propelled chassis, or may be part of the self-contained vehicle 8, as discussed above. The baler 10 and/or the baling chamber 14 may be further defined as having a lateral axis 26, a longitudinal axis 28, and a vertical axis 30. Although the illustrated embodiment includes a horizontal rectangular baler 10, it should be understood that the systems disclosed herein may be readily adapted for use in other types of balers 10, such as vertical balers. Additionally, although the illustrated embodiment includes a baler 10 configured to bind the bale around the lateral axis 26, in other embodiments the baler 10 may be configured to bind the bale around the longitudinal axis 28 and/or the vertical axis 30, as discussed in more detail below.

In the baler 10 of FIG. 3, the material enters the baling chamber 14 through the forward end 22, and the material is compressed within the baling chamber 14 by a forward plunger 32. The forward plunger 32 then moves axially (e.g., along the longitudinal axis 28) within the baling chamber 14 to drive the compressible material rearwardly toward the rear end 24. In the illustrated embodiment, the forward plunger 32 includes a material-facing surface 36. As shown, the forward plunger 32 includes multiple parallel slots 38 open to the baling chamber 14. The slots 38 extend from a first end 40 (e.g., top end) of the forward plunger 32 to a second end 42 (e.g., bottom end) of the forward plunger 32. The slots 38 are generally aligned with the vertical axis 30 of the baler 10 and are spaced apart from one another along the lateral axis 26 substantially evenly across the material-facing surface 36 of the forward plunger 32. As shown, six slots 38 are provided on the material-facing surface 36 of the forward plunger 32, although two, three, four, five, seven, eight, nine, ten, or more slots may be provided in other embodiments. It should be understood that the forward plunger 32 and the material-facing surface 36 of the forward plunger 32 may have any form suitable for compressing the material within the baling chamber 14. For example, the forward plunger 32 may include a series of separate, spaced apart bars, or in other embodiments, the forward plunger 32 may have a uniform, flat material-facing surface 36.

The forward plunger 32 is configured to move axially within the baling chamber 14 in a reciprocating motion along the longitudinal axis 28 of the baler 10. In other words, the forward plunger 32 is configured to move in a first direction 44 (e.g., forward direction or forwardly) and in a second direction 46 (e.g., rearward direction or rearwardly). In the illustrated embodiment, the forward plunger 32 is coupled to an actuator 48 via one or more arms 50. The actuator 48 may be a hydraulic cylinder or a pneumatic cylinder, or the actuator 48 may include a piston that drives a flywheel to power a gearbox. The gearbox may, in turn, rotate crank arms that are coupled to the arms 50, thereby facilitating motion of the forward plunger 32. Regardless of its form, the actuator 48 is configured to control the reciprocating motion of the forward plunger 32.

In the illustrated embodiment, the baler 10 includes a rear door 52 (e.g., a wall or a support structure) disposed at or near the rear end 24 of the baler 10 and opposite the forward plunger 32. As shown, the rear door 52 has multiple parallel tracks 56 configured to open toward the baling chamber 14. The tracks 56 extend from a first end 58 (e.g., top end) of the rear door 52 to a second end 60 (e.g., bottom end) of the rear door 52, and the tracks 56 are generally aligned with the vertical axis 30 of the baler 10. The tracks 56 are spaced apart from one another evenly across the rear door 52 along the lateral axis 26. Furthermore, each track 56 of the rear door 52 is disposed opposite (e.g., aligned with) one corresponding slot 38 of the forward plunger 32. In certain embodiments, the rear door 52 is moveable and is coupled to one or more actuators (e.g., hydraulic cylinders, pneumatic cylinders, etc.) configured to facilitate movement of the rear door 52. For example, the rear door 52 may be configured to move vertically (e.g., along the vertical axis 30) between a closed position that blocks the bale from exiting the baling chamber 14 and an open position that enables the bale to exit the baling chamber 14. In alternate embodiments, the rear door 52 may be configured to rotate relative to the baling chamber 14 to enable the bale to exit the baling chamber. In certain embodiments, the rear door 52 may be configured to move in a reciprocating manner along the longitudinal axis 28 of the baling chamber 14, and thus may be a rear plunger.

As shown in FIG. 3, the baling chamber 14 has a first wall 66 (e.g., a top wall) and a second wall 68 (e.g., a bottom wall), opposite the first wall 66. The first wall 66 and the second wall 68 extend generally between the forward plunger 32 and the rear door 52. In the illustrated embodiment, the first wall 66 and the second wall 68 have multiple parallel tracks 56 open toward the baling chamber 14. The tracks 56 disposed along the first wall 66 and the second wall 68 are positioned parallel to the longitudinal axis 28 of the baler 10. The tracks 56 disposed within the first wall 66 and the second wall 68 may extend along all or some of the length of the baling chamber 14 so as to accommodate the various axial positions of the forward plunger 32. The tracks 56 align with the slots 30 of the forward plunger 32 as the forward plunger 32 moves axially (e.g., along the longitudinal axis 28) within the baling chamber 14, as well as with the tracks 56 of the rear door 52, as discussed in more detail below.

Additionally, the slots 38 of the forward plunger 32 and the tracks 56 align with one another so as to surround, or substantially surround, the baling chamber 14. More specifically, the forward plunger 32 has a first slot 38a that aligns with a corresponding first track 56a of the first wall 66, the second wall 68, and the rear door 52 to substantially surround the baling chamber 14. As noted above, in some embodiments, two, three, four, five, six, or more slots 30 may be provided in the forward plunger 32, and a corresponding number of tracks 56 may be provided in the rear door 52, the first wall 66, and the second wall 68. As discussed in more detail below, the slots 38 and the tracks 56 are aligned to enable a strap to be directed or routed around the baling chamber 14 to strap the compressible material into a bale.

In the illustrated embodiment, the baler 10 includes a spool 74 configured to store and to provide a strap 76 for strapping the material within the baling chamber 14. In certain embodiments, the spool 74 may be accessible and/or removable to facilitate replacement and/or installation of the strap 76. As illustrated, the spool 74 provides the strap 76 to a strap feeding assembly 78, which is configured to direct and/or to propel the strap 76 around at least a portion of the baling chamber 14. For example, the strap feeding assembly 78 propels the strap 76 through at least a portion of the track 56 to surround at least a portion of the bale with the strap 76.

The baler 10 also includes a sealing assembly 80 having a sealing frame 82 and a sealing device 84. As discussed in more detail below, the sealing assembly 80 is configured to move relative to the baling chamber 14 to facilitate routing the strap 76 around the baling chamber 14 and/or to enable sealing of the strap 76 around the bale as the bale exits the baling chamber 14, for example. The sealing device 84 is configured to receive and/or to capture the strap 76, and to seal one portion of the strap 76 to another portion of the strap 76 to form the strap 76 into a sealed loop around the bale. Additionally, the sealing device 84 may be configured to cut the strap 76 and to grip the cut end of the strap 76 to facilitate strapping a subsequent bale. In some embodiments, the strap feeding assembly 78 may be aligned with the sealing device 84, enabling the strap 76 to be fed through the sealing device 84 and into an adjacent portion of the track 56 to facilitate surrounding the bale. In the illustrated embodiment, the strap feeding assembly 78 is integrated into the sealing assembly 80, and/or the sealing assembly 80 may be configured to propel the strap 76 around at least a portion of the baling chamber 14.

The sealing device 84 is coupled to the sealing frame 82 of the sealing assembly 80. The sealing frame 82 may have any suitable form for supporting the sealing device 82 and/or for facilitating movement of the sealing assembly 80 relative to the baling chamber 14. For example, as shown, the sealing frame 82 is positioned adjacent to the first wall 66 and extends laterally (e.g., along the lateral axis 26) between a first side wall 88 and a second side wall 90 of the baling chamber 14. The sealing frame 82 is coupled to a ramp 86 (e.g., an inclined structure) extending vertically upward (e.g., along the vertical axis 30) from the first wall 66 and extending from the first side wall 88 to the second side wall 80. As shown, the ramp extends laterally 26 across the baling chamber 14. However, in alternate embodiments, the ramp 86 may be two separate ramps (e.g., non-contacting ramps) positioned on opposite lateral sides of the baling chamber 14 and configured to support the sealing frame 82.

Although one spool 74, one strap feeding assembly 78, and one sealing device 84 are shown in FIG. 3 for clarity, it should be understood that, in certain embodiments, multiple sets of these components may be provided within the baler 10 to surround the bale with multiple straps 76. For example, as shown in FIG. 3, the spool 74, the strap feeding assembly 78, and the sealing device 84 are aligned with the first track 56a. However, a separate spool 74, strap feeding assembly 78, and sealing device 84 may be provided and aligned with each of the tracks 56. Thus, multiple straps 76 may be directed or routed through the tracks 56 and slots 30 to facilitate strapping the bale, as described in more detail below. Additionally, each of the sealing devices 84 may be coupled to the sealing frame 82. In some embodiments, each of the spools 74 and/or the strap feeding assemblies 78 may also be coupled to the sealing frame 82. As discussed in more detail below, the sealing assembly 80 is configured to move relative to the baling chamber 14 via the sealing frame 82 sliding along the ramps 86, for example. Thus, the components coupled to the sealing frame 82 of the sealing assembly 80 (e.g., the sealing device 84, the strap feeding assembly 78, and/or the spool 74) may move relative to the baling chamber 14 with the sealing frame 82.

As noted above, although the illustrated embodiments show systems for strapping the bale about the lateral axis 26 of the baler 10, it should be understood that the systems disclosed herein may be readily adapted for strapping the bale about the longitudinal axis 28 and/or the vertical axis 30. For example, to strap the bale about the vertical axis 30, the slots 38 may extend across the material-facing surface 36 of the forward plunger 32 such that the slots 38 are aligned with the lateral axis 26 of the baler 10 and are parallel to the top end 40 and to the bottom end 42 of the forward plunger 32. Similarly, the tracks 56 may extend across the rear door 52 such that the tracks 56 are aligned with the lateral axis 26 of the baler 10 and are parallel to the top end 58 and to the bottom end 60 of the rear door 52. In such configurations, each strap 76 may be propelled through the slot 38 extending laterally across the forward plunger 32 and through the track 56 extending laterally across the rear door 52. Additionally, in such configurations, rather than tracks 56 being formed in the top wall 66 and in the bottom wall 68, the tracks 56 may extend along the first side wall 88 and along the second side wall 90 of the baling chamber 14 between the forward plunger 32 and the rear door 52. Furthermore, in such cases, the spool 74, the strap feeding assembly 78, and/or the sealing assembly 80 may be disposed on the first side wall 88 of the baling chamber 14, for example. The components may function together to surround the bale with the strap 76 about the vertical axis 30 of the baler 10 and the components and system may be oriented and adapted for strapping the bale about the vertical axis 30.

The strap 76 may be formed from any suitable relatively high-strength material. For example, the strap 76 may have a strength of about 150 kilograms-force (kgf) to about 1500 kgf. In some embodiments, the strap 76 may have a strength of about 300 kgf to about 1200 kgf. The strap 76 may be any suitable width, although the strap 76 may be about 1 centimeter (cm) to about 5 cm wide, in some embodiments. In certain embodiments, the strap 76 may be formed from carbon steel or plastics, such as polypropylene or polyester. In some embodiments, the baler 10 is configured to form bales that are about 2 to about 3 meters long (along the longitudinal axis 28) by about 1 to about 2 meters wide (along the lateral axis 26) by about 0.5 to about 1 meters tall (along the vertical axis 30), and the strap 76 is of a suitable strength to securely strap bales of this size.

Additionally, the baler 10 depicted in FIG. 3 includes a needle 92, which may be generally disposed adjacent to the second wall 68 of the baling chamber 14. The needle 92 is configured to move through the baling chamber 14, and in some embodiments, the needle 92 may move through the baling chamber 14 along an arcuate path. In the illustrated embodiment, the needle 92 is configured to rotate about an attachment 94 coupled to a first end 96 of the needle 92. Additionally, in certain embodiments, the needle 92 may be coupled to a gripping assembly 98 disposed generally near (e.g., proximate to) a second end 100 of the needle 92. The gripping assembly 98 of the needle 92 is configured to receive and to grip the strap 76. The needle 92 and the gripping assembly 98 may have any of a variety of configurations and may serve any of a variety of functions, as described in more detail below. For example, the needle 92 may be configured to transport the strap 76 from the second wall 68 to the first wall 66 of the baling chamber 14 to wrap the strap 76 around the bale and/or to transfer the strap 76 to the sealing device 84 of the sealing assembly 80.

Figure 4:
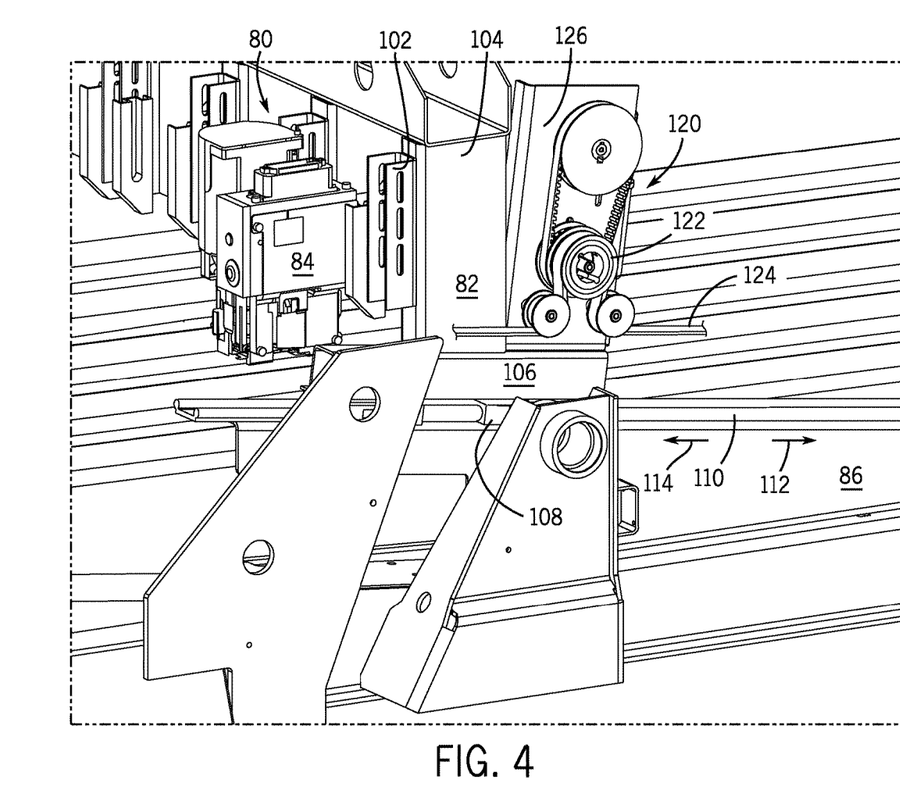
FIG. 4 is a perspective view of an embodiment of a sealing assembly that may be used to seal a strap around a bale of material in a baling chamber.

FIG. 4 is a perspective view of an embodiment of the sealing assembly 80 that may be used to seal the strap 76 around a bale of material in the baling chamber 14. As shown, the sealing device 84 is coupled to the sealing frame 82 via brackets 102, although the sealing device 84 may be coupled to the sealing frame 82 via any suitable element or technique. Additionally, the sealing device 84, the sealing frame 82, and/or the brackets 102 may be coupled to one another via any suitable technique, such as crimping, welding, or any suitable fastener (e.g., bolts).

In the illustrated embodiment, the sealing frame 82 includes a first portion 104 to which the sealing device 84 is coupled and a second portion 106 configured to support or include a sliding mechanism 108. The first portion 104 extends generally vertically (e.g., parallel to the vertical axis 30), and the second portion 106 extends generally parallel to the ramp 86 to facilitate movement along the ramp 86 and to provide stability as the sealing frame 82 moves along the ramp 86, for example. The second portion 106 may be coupled to or may include the sliding mechanism 108 (e.g., a slide) configured to slidingly engage a rail 110 of the ramp 86. The sliding mechanism 108 and the rail 110 may have corresponding shapes that enable the sliding mechanism 108 to wrap around and/or interlock with the rail 110 to block the sealing frame 82 from separating from the rail 110. Thus, the sealing assembly 80 may move in a first direction 112 and in a second direction 114 via the sliding mechanism 108 sliding along the rail 110. In some embodiments, the sealing assembly 80 may move in the first direction 112 as the sealing device 84 seals the strap 76 around the bale, as discussed in more detail below. In some embodiments, the sealing assembly 80 may move in the second direction to enable the sealing device 84 to receive the strap 76 from the needle 92 (shown in FIG. 3) and to surround the bale with the strap 76. The sliding mechanism 108 may be integrally formed with the sealing frame 82 (e.g., from a single, homogenous, and/or continuous material) or the sliding mechanism 108 may be fixed to the sealing frame 82 via any suitable technique, such as crimping, welding, or a fastener (e.g., one or more bolts), for example. Similarly, the rail 110 may be integrally formed with the ramp 86 or may be coupled to the ramp 86 via any suitable technique.

A drive mechanism 120 is provided to facilitate movement of the sealing assembly 80 along the ramp 86. The drive mechanism 120 may have any form suitable for facilitating such movement. For example, as shown, the drive mechanism 120 includes a pinion 122 and belt 124 configured to convert rotational motion of a motor into linear motion. Thus, rotation of the pinion 122 induces the sealing assembly 80 to move along the ramp 86 relative to the baling chamber 14. The pinion 122 is a rotatable member configured to drive movement of the sealing assembly 80. At least some components of the drive mechanism 120 may be directly mounted to the sealing frame 82 or to a plate 126 coupled to the sealing frame 82, and thus may move relative to the baling chamber 14 as the sealing assembly 80 moves along the ramp 86. For example, the motor and the pinion 122 may be coupled to the sealing frame 82 or to the plate 126. Additionally, it should be understood that any suitable actuator, including a hydraulic cylinder or a pneumatic cylinder, may be utilized to drive movement of the sealing assembly 80 relative to the baling chamber 14.

Figure 5:
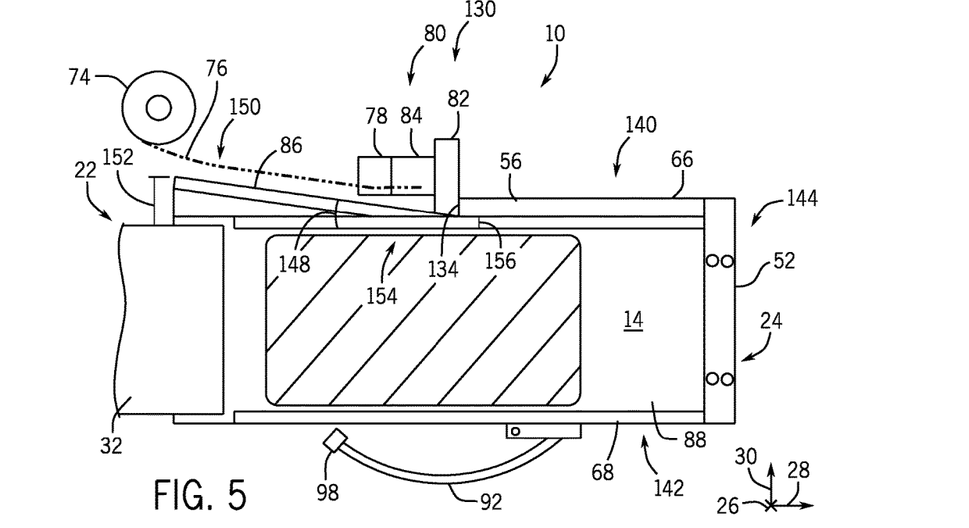
FIG. 5 is a side cross-sectional view of the baler of FIG. 3, in which a sealing assembly is in a first position relative to the baling chamber prior to strapping a bale.

FIG. 5 is a side cross-sectional view of the baler 10 of FIG. 3, in which the sealing assembly 80 is in a first position 130 relative to the baling chamber 14 prior to strapping a bale. While the sealing assembly 80 is in the first position 130, the sealing assembly 80 is disposed adjacent to a first end 134 of the track 56 of the first wall 66. The strap 76 may extend from the spool 74 and/or the strap feeding assembly 78 to the sealing assembly 80. The sealing device 84 may grip and/or hold the strap 76 in preparation for routing the strap 76 into the track 56 of the first wall 66 to initiate a strapping process, as disclosed below with respect to FIGS. 6-9.

As shown, the top wall 66 is positioned on a first side 140 of the baling chamber 14 and the bottom wall 68 is positioned on a second side 142 of the baling chamber 14. The forward plunger 32 is configured to compress material within the baling chamber 14. The rear door 52 is shown in a closed position 144, although at this stage prior to strapping the bale, the rear door 52 may be in an open position or in the closed position 144. Additionally, the first side wall 88 and second side wall 90 may be configured to frictionally maintain the material within the baling chamber 14 as the forward plunger 32 moves within the baling chamber 14, thereby facilitating compression of the material. As shown, the baler 10 includes the needle 92, which is configured to grip the strap 76 and to transfer the strap 76 from the second side 142 to the first side 140 of the baling chamber 14, as discussed in more detail below.

The spool 74, the strap feeding assembly 78, and the sealing assembly 80 are positioned on the first side 140 of the baling chamber 14. As noted above, in some embodiments, the strap feeding assembly 78 and/or the spool 74 may be coupled to the sealing frame 82 to enable the strap feeding assembly 78 and/or the spool 74 to move relative to the baling chamber 14 with the sealing assembly 80. As shown, the ramp 86 is declined along the longitudinal axis 28 the rearward direction 46. An angle 148 of the ramp 86 relative to the top wall 66 of the baling chamber 14 may be any suitable angle to facilitate transfer of the strap 76 from the sealing assembly 80 to the track 56, such as 1-45 degrees, 5-30 degrees, 10-20 degrees, or the like. Thus, the ramp 86 includes an upper portion 150 with a first vertical height 152 (e.g., along the vertical axis 30) above the first wall 66 of the baling chamber 14 and a lower portion 154 with a second vertical height 156, less than the first vertical height 152, above the first wall 66. The upper portion 150 is positioned adjacent the first end 22 of the baling chamber 14, while the lower portion 154 may be positioned adjacent the first end 134 of the track 56. Furthermore, the ramp 86 may have any suitable length for carrying out the techniques disclosed herein. For example, as shown, the ramp 86 generally extends between the first end 22 of the baling chamber 14 to the first end 134 of the track 56 of the top wall 66. In some embodiments, the track 56 on the top wall 66 may not be provided, and in such cases, the ramp 86 may generally extend to the second end 24 of the baling chamber 14 to facilitate routing the strap 76 into the track 56 of the rear door 52.

Movement of the sealing assembly 80 may generally provide several advantages. For example, as discussed in more detail below, such movement aligns the strap 76 with the first end 134 of the track 56 and enables the strap 76 to be routed and/or fed into the track 56 of the top wall 66 of the baling chamber 14. Additionally, such movement enables the sealing assembly 80 to move with the bale and to seal the strap 76 into a loop around the bale as the bale travels rearwardly within the baling chamber 14 toward an outlet to exit the baling chamber 14, as described in detail below. Thus, bales may be formed and strapped efficient as material may accumulate within the baling chamber 14 to begin formation of a subsequent bale while the prior bale is being strapped and moving toward the outlet of the baling chamber 14.

Figure 6:
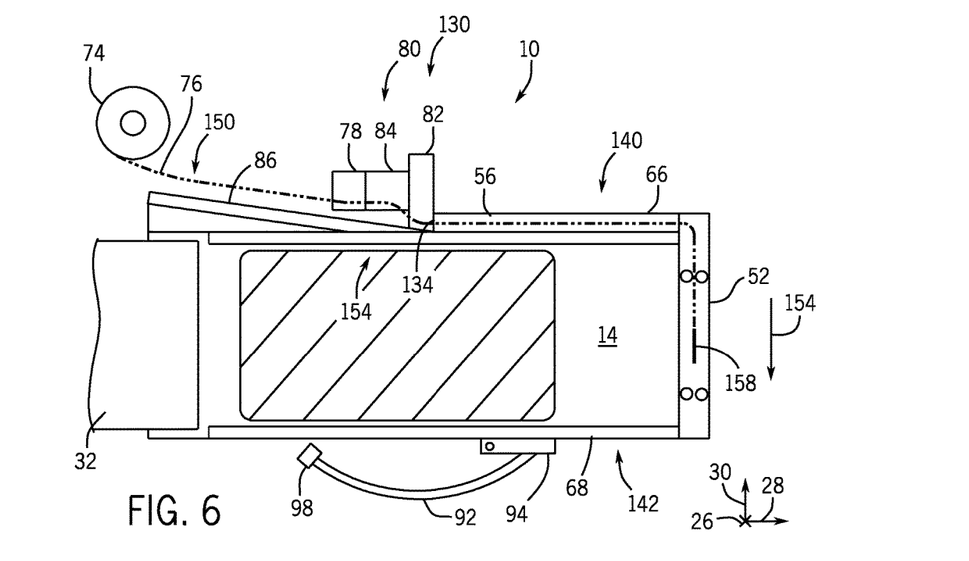
FIG. 6 is a side cross-sectional view of the baler of FIG. 3, in which a strap is propelled into a track adjacent to the sealing assembly while the sealing assembly is in the first position.

FIG. 6 is a side cross-sectional view of the baler 10 of FIG. 3, in which the sealing assembly 80 is in the first position 130 and the strap 76 is propelled into the track 56. As noted above, in the first position 130, the sealing assembly 80 may be disposed proximate the lower portion 154 of the ramp 86 and adjacent to the first end 134 of the track 56 of the first wall 66. The sealing assembly 80 may position and/or align an end 158 of the strap 76 with the first end 134 of the track 56. The strap 76 may also extend from the spool 74 and/or the strap feeding assembly 78 to the sealing assembly 80.

As shown, the strap feeding assembly 78 propels the strap 76 through the sealing assembly 80 and into track 56. In some embodiments, the strap feeding assembly 78 may propel the strap 76 into the track 56 at a predetermined time after the rear door 52 is moved into the closed position 144, at a predetermined time after the prior bale exits the baling chamber 14, or after the material reaches a predetermined density within the baling chamber 14. Furthermore, the track 56 of the top wall 66 is aligned with the track 56 of the rear door 52 to enable the strap feeding assembly 78 to direct and/or propel the strap 76 from the first side 140 to the second side 142 of the baling chamber 14, as shown by arrow 154.

Figure 7:
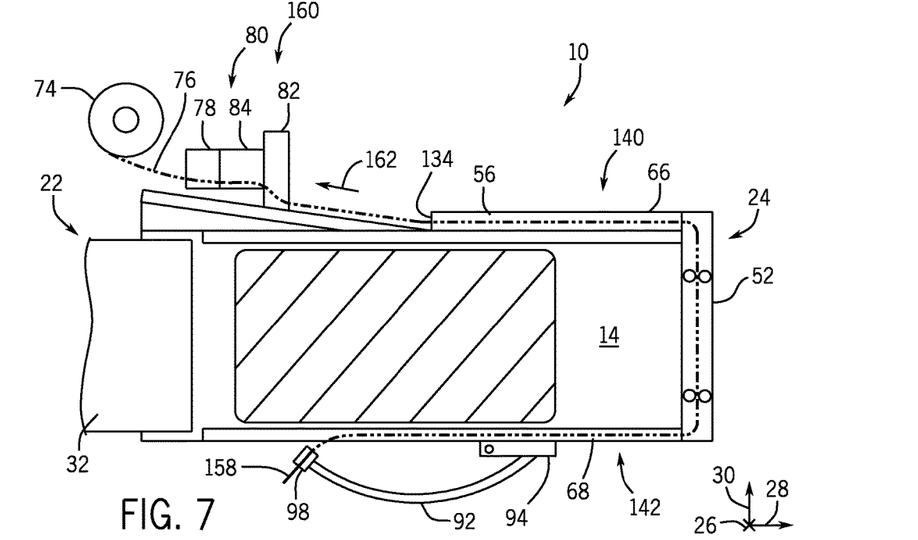
FIG. 7 is a side cross-sectional view of the baler of FIG. 3, in which the sealing assembly is in a second position and a needle grips the strap.

FIG. 7 is a side cross-sectional view of the baler of FIG. 3, in which the sealing assembly 80 is in a second position 160 and the needle 92 grips the strap 76. As shown, the end 158 of the strap 76 is propelled around a portion of the baling chamber 14 via the tracks 56 of the first wall 66, the rear door 52, and the second wall 68. The end 158 of the strap 76 is then fed and/or directed into the gripping assembly 98 of the needle 92, which grips and/or holds the strap 76. As discussed above, the needle 92 is positioned adjacent to the second wall 68 of the baling chamber 14.

The sealing assembly 80 may move from the first position 130 to the second position 160 adjacent to the first end 22 of the baling chamber 14 and/or the upper portion 150 of the ramp 86. The sealing assembly 80 may move from the first position 130 to the second position 160, as shown by arrow 162, at any suitable time during the strapping process. For example, the sealing assembly 80 may move from the first position 130 to the second position 160 at a predetermined time after the strap 76 is propelled into the track 56 and/or at a predetermined time after the strap 76 is gripped by the gripping assembly 98 of the needle 92. Movement of the sealing assembly 80 to the second position 160 enables the sealing device 84 to receive the end 158 of the strap 76 as the needle 92 transfers the end 158 of the strap 76 from the second side 142 to the first side 140 of the baling chamber 14, as discussed below with respect to FIG. 8.

Figure 8:
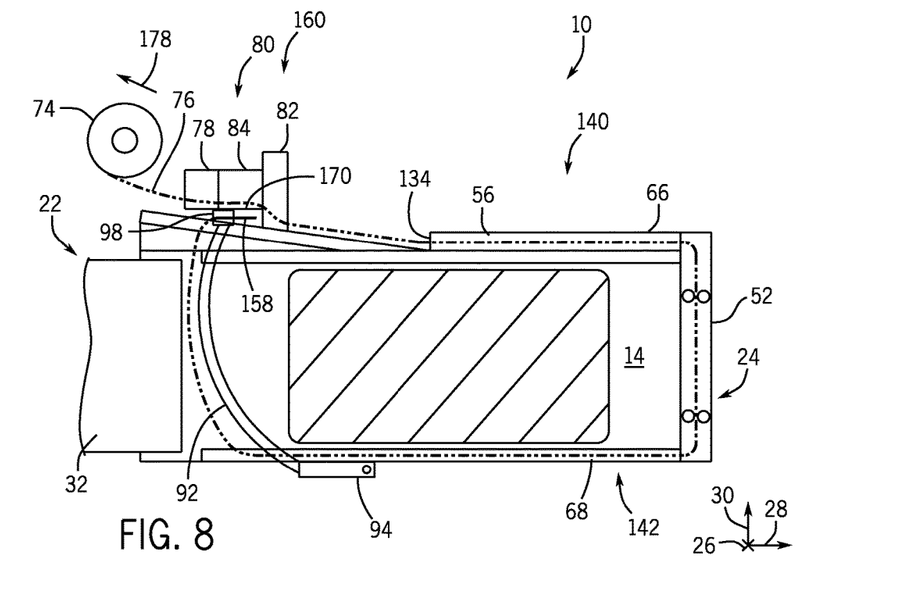
FIG. 8 is a side cross-sectional view of the baler of FIG. 3, in which the needle extends through the baling chamber to transfer an end of the strap to the sealing assembly while the sealing assembly is in the second position.

FIG. 8 is a side cross-sectional view of the baler 10 of FIG. 3, in which the needle 92 extends through the baling chamber 14 to transfer the end 158 of the strap 76 to the sealing device 84 of the sealing assembly 80. The needle 92 is configured to feed the end 158 of the strap 76 into an opening 170 of the sealing device 84 that is configured to receive the end 158 of the strap 76. As noted above with respect to FIG. 7, the needle 92 is configured to transfer the end 158 of the strap 76 to the sealing device 84 while the sealing assembly 80 is in the second position 160. Once the end 158 of the strap 76 is received by the sealing device 84, the strap feeding assembly 78 or any other suitable device may retract (e.g., pull back) on the strap 76 as indicated by arrow 178, thus tightening the strap 76 around the bale prior to the strap 76 being sealed. In some embodiments, the strap 76 may be configured to separate from all or a portion of the track 56 and to surround the bale as the strap 76 is retracted by the strap feeding assembly 78.

Figure 9:
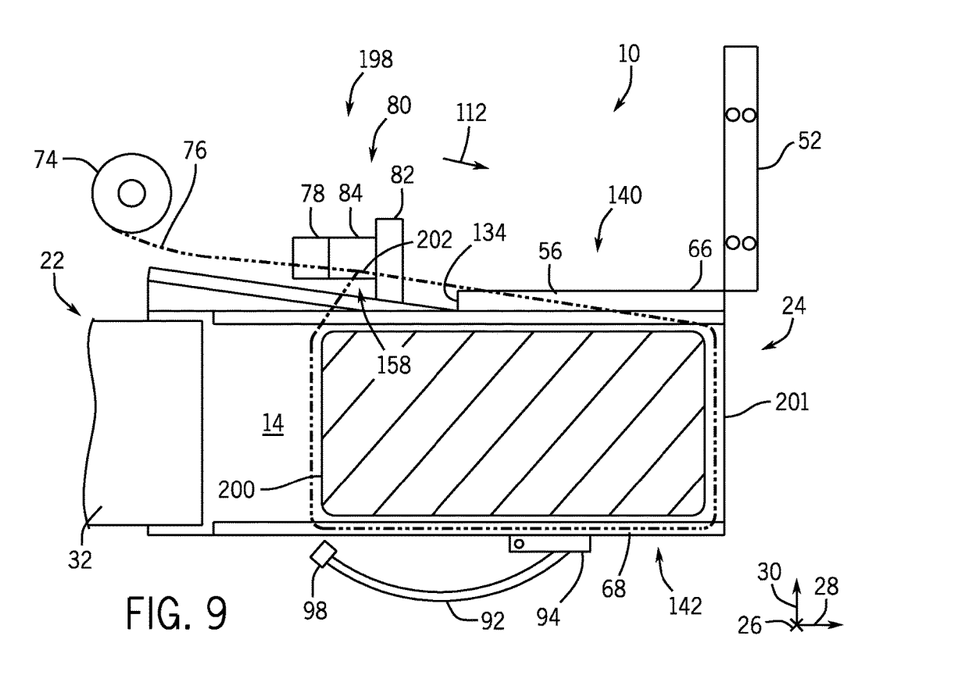
FIG. 9 is a side cross-sectional view of the baler of FIG. 3, in which the sealing assembly is in a third position as the strap is sealed around the bale and as the bale moves out of the baling chamber.

FIG. 9 is a side cross-sectional view of the baler 10 of FIG. 3, in which the sealing assembly 80 is in a third position 198 (e.g., an intermediate position) as the strap 76 is sealed around a bale 200 and as the bale 200 is removed from the baling chamber 14. As shown, the third position 198 is located between the first position 130 and the second position 160. Once the end 158 of the strap 76 is received by the sealing device 84, the sealing device 84 seals the end 158 of the strap 76 to another portion 202 of the strap 76 as the sealing assembly 80 moves from the second position 160 toward the first position 130 in the first direction 112 along the ramp 86. Once the strap 76 is sealed around the bale 200, the sealing device 84 releases the strap 56. The bale 200 exits the baling chamber through the outlet 201 at the second end 24 of the baling chamber 14, and the material is contained by the straps 76 (e.g., the straps 76 limit the expansion of the compressible material once the bale 200 exits the baling chamber 14). In some embodiments, the rear door 52 moves away from the second end 24 of the baling chamber 14 (e.g., moves vertically 30 or pivots relative to the baling chamber 14) to enable the bale 200 to exit through the outlet 201 of the baling chamber 14.

Such movement of the sealing assembly 80 relative to the baling chamber 14 as the strap 76 is sealed around the bale 200 provides several advantages. For example, such movement provides for an efficient strapping process because the baler 10 may continue to receive and accumulate material in the baling chamber 14 for generation of a subsequent bale prior to completion of the sealing process and/or as the strapped bale moves toward the outlet 201 of the baling chamber 14. Additionally, because the sealing assembly 80 moves in the first direction 112 as the strap 76 is sealed around the bale 200, the sealing assembly 80 may be positioned at or proximate to the first position 130 upon completion of the strapping process. Thus, the sealing assembly 80 may be appropriately positioned to align the strap 76 with the first end 134 of the track 56 to begin a strapping process for the subsequent bale in an efficient manner.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An agricultural baler comprising:
   a baling chamber configured to receive a compressible material and to compress the compressible material into a bale;
   a track positioned about at least a portion of the baling chamber, wherein the track is configured to receive a strap and to guide the strap around the portion of the baling chamber; and
   a sealing assembly positioned adjacent to a first side of the baling chamber and configured to receive the strap and to seal the strap into a loop around the bale, wherein the sealing assembly is configured to move relative to the baling chamber and to seal the strap into the loop around the bale as the bale moves toward an outlet at a second end of the baling chamber,
   wherein the sealing assembly is configured to slidingly move along a ramp coupled to a frame defining the baling chamber, and wherein the ramp is declined relative to a longitudinal axis of the baling chamber in a rearward direction from a first end toward the second end of the baling chamber.

2. The agricultural baler of claim 1, wherein the sealing assembly comprises a sealing device configured to seal the strap into the loop around the bale and a sealing frame coupled to the sealing device and extending laterally across the baling chamber, wherein the sealing frame is configured to support the sealing device and to facilitate movement of the sealing assembly relative to the baling chamber.

3. The agricultural baler of claim 1, wherein the sealing assembly comprises a sealing frame having a slide mechanism configured to slidingly engage a rail positioned at an angle relative to a top wall of the top side of the baling chamber and extending along a longitudinal axis of the baling chamber, wherein the slide mechanism enables the sealing assembly to move relative to the baling chamber.

4. The agricultural baler of claim 1, comprising a strap feeding assembly configured to propel the strap through the track.

5. The agricultural baler of claim 1, comprising a needle positioned on a second side of the baling chamber, opposite the first side, wherein the needle is configured to receive the strap from the track and to transfer the strap across the baling chamber to the sealing assembly.

6. The agricultural baler of claim 1, wherein the sealing assembly is configured to move relative to the baling chamber to a first position adjacent to a first end of the track to align an end of the strap with the first end of the track, the first end of the track being disposed between a first end and the second end of the baling chamber.

7. The agricultural baler of claim 6, comprising a needle positioned on a second side of the baling chamber, opposite the first side, wherein the needle is configured to transfer the strap from the second side to the first side of the baling chamber, wherein the sealing assembly is configured to move relative to the baling chamber to a second position adjacent the first end of the baling chamber to facilitate receiving the strap from the needle.

8. An agricultural baler comprising:
   a baling chamber configured to receive a compressible material and to compress the compressible material into a bale; and
   a sealing assembly comprising:
      a sealing device configured to seal a strap into a loop around the bale; and a sealing frame coupled to the sealing device, wherein the sealing frame comprises a slide mechanism configured to enable the sealing assembly to move relative to the baling chamber as the sealing device seals the strap into the loop around the bale and as the bale moves toward an outlet at a second end of the baling chamber,
   wherein the sealing assembly is configured to move along a ramp coupled to a frame defining the baling chamber, wherein the ramp is declined relative to a longitudinal axis of the baling chamber in a rearward direction from a first end toward the second end of the baling chamber.

9. The agricultural baler of claim 8, comprising a track positioned about at least a portion of the baling chamber and a strap feeding assembly configured to propel the strap through the track to surround the baling chamber with the strap.

10. The agricultural baler of claim 8, comprising a track surrounding at least a portion of the baling chamber, wherein the sealing assembly is configured to move from a first position adjacent to a first end of a track disposed between a first end and the second end of the baling chamber to a second position proximate to the first end of the baling chamber.

11. The agricultural baler of claim 10, wherein the sealing assembly is positioned on a first side of the baling chamber, the agricultural baler comprises a needle positioned on a second side of the baling chamber, opposite the first side, and the needle is configured to receive and to grip the strap and to transfer the strap from the second side of the baling chamber to the sealing assembly while the sealing assembly is in the second position.

12. A method for baling an agricultural crop material comprising:
   feeding an end of a strap into a track extending around at least a portion of a baling chamber while a sealing assembly is in a first position;
   moving the sealing assembly in a forward direction from the first position to a second position after the end of the strap is fed into the track to position the sealing assembly for receiving the end of the strap after the strap travels through the track and around the baling chamber;

transferring the end of the strap into an opening of the sealing assembly while the sealing assembly is in the second position; and sealing the end of the strap to another portion of the strap with the sealing assembly as the sealing assembly moves in a rearward direction from the second position toward the first position to form a strapped bale, wherein the sealing assembly comprises a sealing device configured to seal the strap into a loop and a sealing frame coupled to the sealing device, wherein the sealing frame extends laterally across the baling chamber and is configured to slide along rails coupled to a frame of the baling chamber as the sealing device seals the strap into the loop around the agricultural crop material to form the strapped bale, and wherein the rails are declined relative to a longitudinal axis of the baling chamber in the rearward direction between a first end and a second end of the baling chamber.

13. The method of claim 12, comprising collecting the agricultural crop material in the baling chamber and compressing the agricultural crop material into a bale via a plunger.

14. The method of claim 12, comprising propelling the end of the strap through the track via a strap feeding assembly coupled to the sealing assembly.

15. The method of claim 12, comprising directing the end of the strap from the track into a gripping assembly of a needle that is configured to transfer the end of the strap across the baling chamber and into the opening of the sealing assembly, wherein the sealing assembly is configured to move in the forward direction from the first position to the second position at a predetermined time after the strap is received by the gripping assembly of the needle.

* * * * *